United States Patent [19]

Reunamäki

[11] Patent Number: 4,751,776
[45] Date of Patent: Jun. 21, 1988

[54] END CAP FOR A CERAMIC SPOOL

[75] Inventor: Pauli T. Reunamäki, Nattari, Finland

[73] Assignee: O/Y Kyro A/B Tamglass, Tampere, Finland

[21] Appl. No.: 908,300

[22] Filed: Sep. 17, 1986

[30] Foreign Application Priority Data

Sep. 30, 1985 [FI] Finland ............... 853755

[51] Int. Cl.⁴ .............. B21B 31/08; B60B 7/06
[52] U.S. Cl. .................. 29/129; 29/115;
 29/426.6; 29/450; 65/181; 432/246
[58] Field of Search ............ 29/115, 126, 123, 450,
 29/129, 426.6; 65/181; 432/246

[56] References Cited

U.S. PATENT DOCUMENTS

| 23,436 | 4/1859 | Bailey | 29/515 X |
|---|---|---|---|
| 732,907 | 7/1903 | Storr | 29/515 UX |
| 2,703,918 | 3/1955 | Muza | 29/126 X |
| 3,867,748 | 2/1975 | Miller . | |
| 3,986,226 | 10/1976 | Roe et al. | 29/129 X |
| 4,140,486 | 2/1979 | Nitschke . | |
| 4,242,782 | 1/1981 | Hanneken et al. . | |
| 4,399,598 | 8/1983 | Page et al. | 29/115 |
| 4,404,011 | 9/1983 | McMaster . | |
| 4,561,763 | 12/1985 | Basch | 29/126 X |

FOREIGN PATENT DOCUMENTS 1175657 10/1984 Canada .
938809 2/1956 Fed. Rep. of Germany ........ 29/126

Primary Examiner—Charlie T. Moon
Attorney, Agent, or Firm—Burns, Doane, Swecker & Mathis

[57] ABSTRACT

The invention relates to an end cap for a ceramic spool as well as to a method of and device for mounting it on the end of such a spool. The quill portion (5) of an end cap is divided by means of slits (9) into strips (10), the first ends of which are rigidly connected to a ring (12) formed by the open quill end and the other ends are rigidly connected to a flange (13) closing the other quill end, with a stub axle (6) projecting from said flange. Provided in the middle of strips (10) are threaded holes (11). The annular jacket (7) of said auxiliary device (3) can be fitted around said end cap quill (5) with a small annular clearance remaining therebetween. The annular jacket (7) is circumferentially provided with holes (17) with screws (18) extending therethrough and engageable in threaded holes (11). By turning screws (18), said strips (10) can be bent outwards so as to fit the spool end (4) inside quill (5). When screws (18) are unscrewed, strips (10) return elastically inwards and squeeze around the spool end (4).

7 Claims, 3 Drawing Sheets

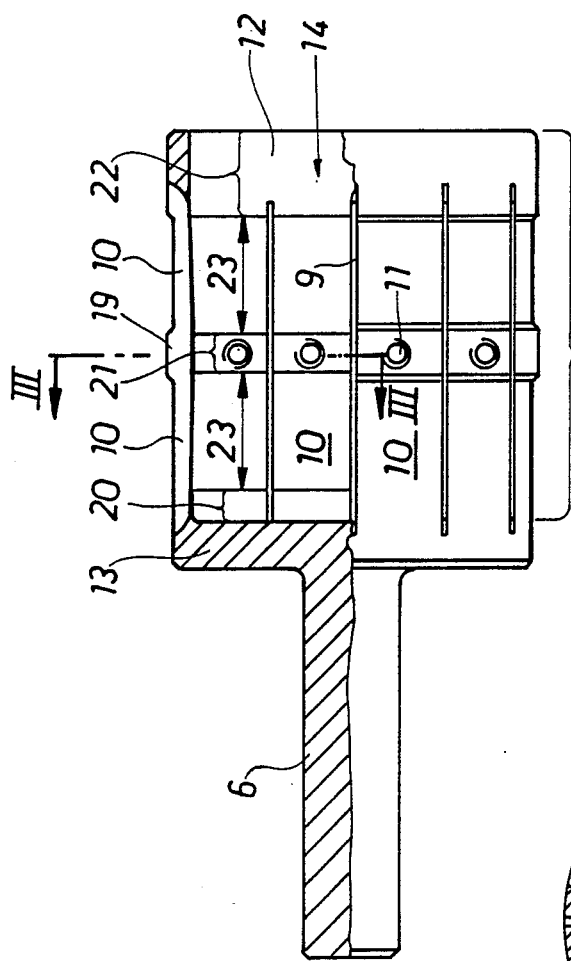
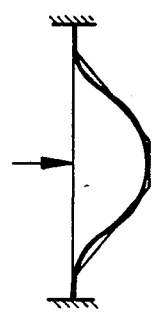
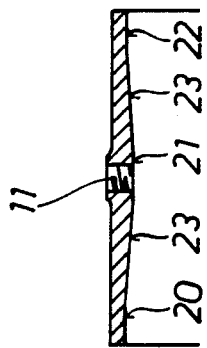
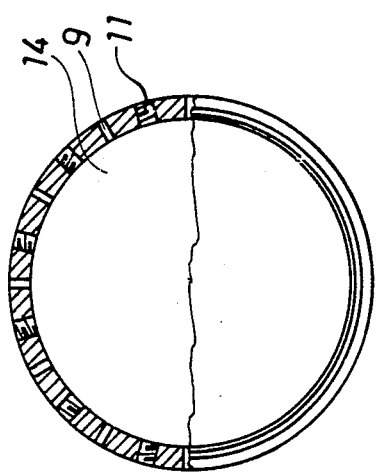

END CAP FOR A CERAMIC SPOOL

The present invention relates to an end cap for a ceramic spool, comprising a metal quill which defines a space open at one end wherein the spool end can be inserted and fastened. The invention relates also to a method of installing and mounting an end cap on the end of a ceramic spool. Furthermore, the invention relates to an auxiliary device for carrying out the method.

Ceramic spools are used e.g. in glass sheet tempering furnaces for supporting glass sheets. In order to support ceramic spools e.g. by means of bearings, the spool ends are provided with metal end caps which may be accompanied by a stub axle for mounting bearings and/or a drive wheel.

Due to the different thermal expansion characteristics of a ceramic spool and a metal end cap, there have been problems in providing a reliable fastening between the end cap and the end of a spool. Attempts have been made to solve the problem as follows.

U.S. Pat. No. 3,867,748 suggests that a heat-expanding adhesive be placed in the annular space between the end of a spool and the quill portion of an end cap surrounding it. In normal operating conditions, with the spool end outside the heat insulations of a furnace, temperature of the joint remains sufficiently low for a desired adhesion effect. E.g. for the replacement of a damaged spool, however, such a spool cannot be pulled through a hot furnace as the adhesive would burn and lose its adhesion power. Thus, the furnace must be cooled for the replacement of a spool which leads to substantial cuts in production. In practice, the adhesive has been a two-component mixture, whereby the furnace operator himself cannot repair a broken spool by replacing the end cap but, instead, the spool must be sent to the manufacturer for repairs. An essential drawback is that a fastening accomplished by means of such adhesive is always flexible to some extent, whereby the axial alignment of an end cap and its concentricity with the spool axis cannot be assured with sufficient accuracy. This causes vibration in the rotation of spools and means poorer production quality.

U.S. Pat. No. 4,242,782 proposes the fastening by means of elastic O-rings. However this involves the same problems as above since the heat resistance of elastic O-rings is limited, nor can the axial alignment of the end cap maintained as the stub axle is exposed to a radial load while the metal quill portion of an end cap loosens around the end of a ceramic spool upon expanding at normal operating temperature.

U.S. Pat. No. 4,140,486 suggests that the end cap be compressed in position by means of a coil spring which surrounds the spool end and the end cap. In order to achieve sufficiently firm fastening by means of a coil spring, the spring must be extremely sturdy and rigid. A result of this is that the installation and mounting as well as removal of an end cap is very inconvenient and involves a lot of work. This requires also a multi-stepped reduction in diameter at the. spool end; a first step for accommodating the spring and a second step for accommodating the end cap. If the end cap is accompanied by a long stub axle, even this solution does not guarantee a fastening sufficiently firm for maintaining the axial alignment of said stub axle since the end cap, upon expanding, becomes loose with respect to the spool end inserted therein. After all, the spring coil is not capable of withstanding locally, e.g. over s single turn of a spring, any major torsional forces without elastic deformation.

European Patent publication No. 0 055 927 discloses an end cap fastening system, wherein spring tabs are placed between the end cap quill portion and the spool end. A problem in this solution is the inaccuracy in centering the end cap. With this solution, it is also difficult to achieve a tightness sufficient for secure axial alignment if the bracing is effected by journaling a stub axle extending from the end cap. The installation and removal of an end cap is also inconvenient due to the major spring forces that are necessary.

Canadian Patent publication No. 1 175 657 anticipates a solution wherein metal rings are placed between the end cap quill portion and the spool end, said rings being provided with axial ridges which are forced to compress radially when the spool end is slammed inside the end cap. Also this solution involves the same problems as above, i.e. inaccuracy in centering, loss of axial alignment due to the action of radial forces on the end of a stub axle upon thermal expansion of metal components, as well as difficulties in mounting and removing with sufficiently tight fit.

An object of the invention is to provide a novel type of end cap as well as a method and apparatus for fastening it, whereby the above problems are eliminated.

This object is accomplished with an end cap of the invention in such a way that the quill wall is divided by means of slits into strips, that the open end of said quill comprises an unbroken ring portion to which the strip ends are rigidly connected, and that the strips are provided with gripping means for external gripping. Such an end cap can be installed in position and fastened by applying the method of this invention in a manner that said strips are bent by pulling radially outwards at the gripping means of the strips for increasing the internal diameter of said quill at least over a part of the axial length of the quill, followed by inserting the end of a ceramic spool inside the quill and the strip-bending tensional force is released whereby the strips, as a result of elastic deformation, deflect back and squeeze around the spool end.

For carrying out the method, the invention further offers an auxiliary device that can be fitted around the quill portion of an end cap and whose periphery is provided with gripping and pulling means engageable with the gripping means of said strips and the internal diameter of an annular mantle at the gripping and pulling means is dimensioned to be a little distance larger than the external diameter of the end cap quill at the gripping means.

One embodiment of the invention will now be described in more detail with reference made to the accompanying drawings, in which FIG. 1 is an axonometric exploded view of the end of a ceramic spool, and end cap of the invention installable and mountable thereon, and an auxiliary device for mounting and fastening the end cap.

FIG. 2 shows an end cap of the invention in side view with the portion above center axis broken away.

FIG. 2a shows the wall of the quill portion of an end cap in axial section.

FIG. 2b shows the bending line of a beam fastened rigidly at both ends.

FIG. 3 shows an end cap from the side of its open end, the portion above center axis being a section along line III—III in FIG. 2.

Figure 1:
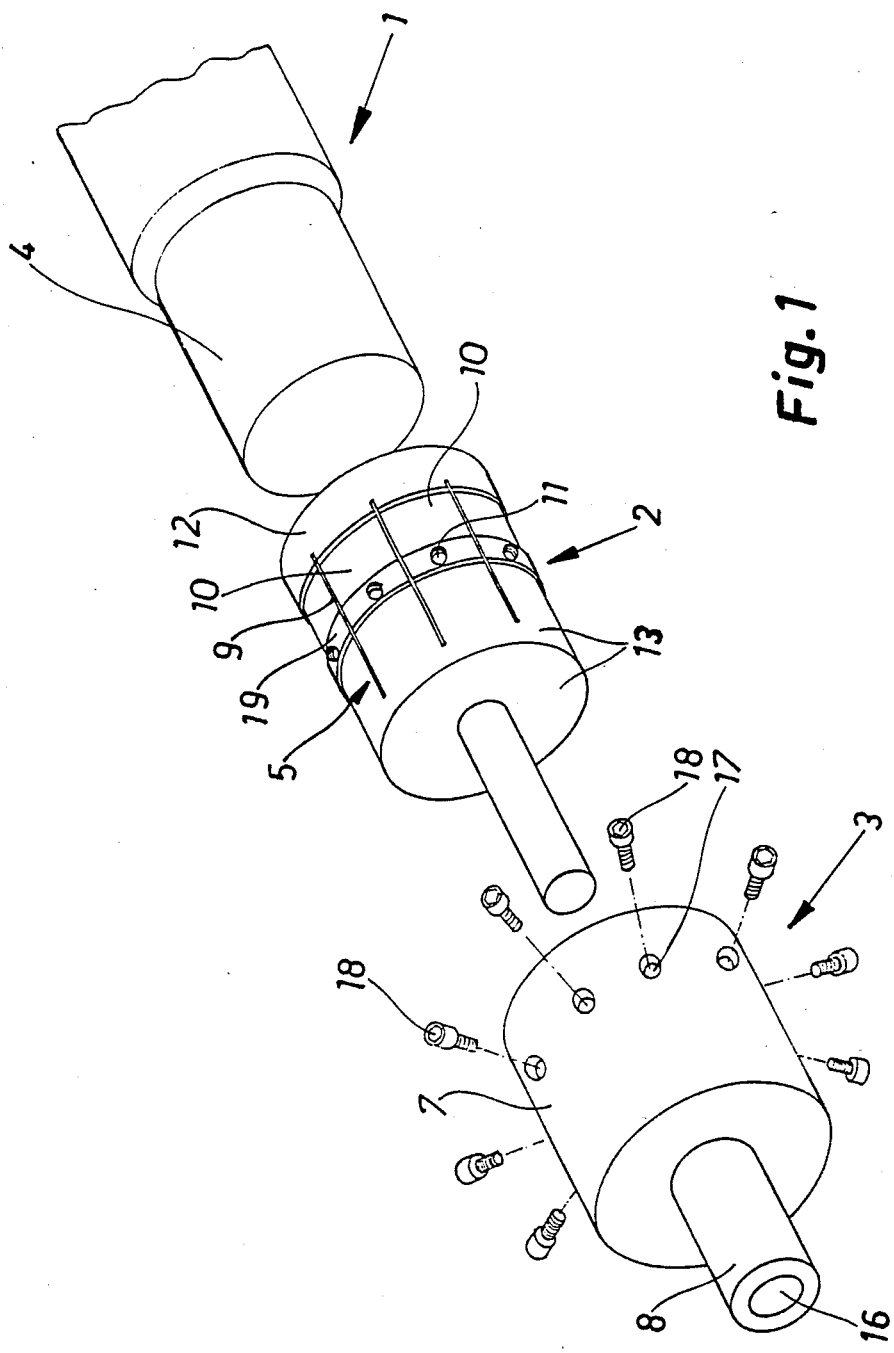
Figure 4:
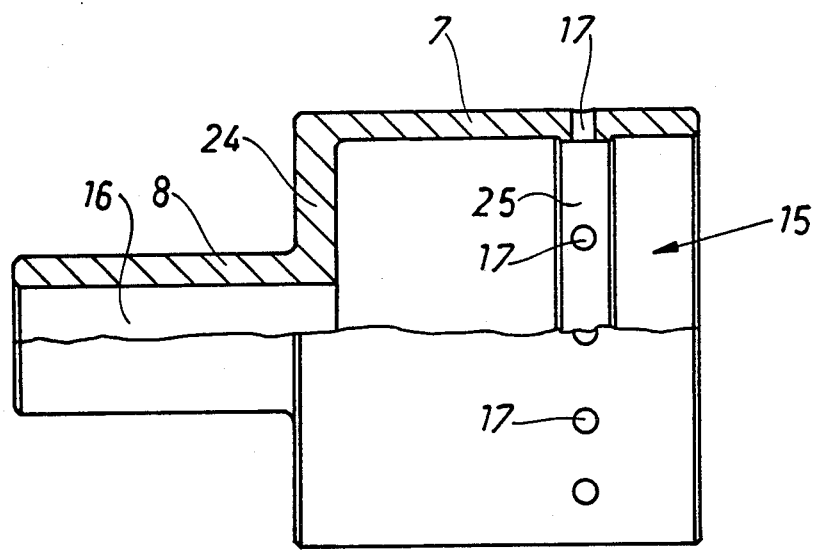
FIG. 4 is a side view of an auxiliary device of the invention with the portion above center axis broken away.

Referring to FIG. 1, the end of a ceramic spool 1 comprises a narrowed section 4 for inserting inside an end cap 2 for fastening said end cap 2 with high precision and fit to the end 4 of said spool 1. For this purpose, the wall of the quill-shaped portion 5 of said end cap 2 is provided with axial slits 9 with wall strips 10 remaining therebetween. Slits 9 do not extend all the way to the open end of quill 5 but the open end of quill 5 will form an unbroken ring portion 12 to which the ends of strips 10 are rigidly connected. Thus, strips 10 and ring portion 12 are integral with each other. The other ends of strips 10 are rigidly connected to an end flange 13 closing the other end of said end cap. Of course, slits 9 need not be extended all the way to end flange 13 but there may remain an unbroken annular portion adjacent to end flange 13.

In the midway area of strips 10, the outer surface of quill 5 has an annular rib 19. At the annular rib 19, each strip 10 is provided with threaded holes 11.

The inner surface of the end cap quill portion 5 is also of a special design, described below with reference to FIG. 2. At the external annular rib 19, the internal diameter of quill 5 has its minimum point 21. This minimum point 21 can be e.g. in the form of an axially short cylindrical surface or, alternatively, it may be a minimum point comprising a plurality of annular ridges spaced from each other by a small axial distance.

The end sections of quill portion 5 have the internal diameter maximum points 20 and 22, whereat the inner quill surface is provided with axially short cylinder sections. The diameter of these cylinder sections 20 and 22 matches the external diameter of spool end 4 with a suitable sliding fit. Between the minimum and maximum points of the internal quill diameter there are zones 23, whereat the internal diameter expands conically when progressing from minimum diameter 21 to maximum diameters 20 and 22.

Upon pulling outwards at threaded holes 10 in the quill wall strips 10, said strips 10 can be bent so that the minimum diameter 21 expands so as to be equal to the maximum diameters 20 and 22. Thus, the spool end 4 can be inserted in the end cap interior 14 with a suitable sliding fit without forceful driving or slamming which could break the spool end 4. The difference between maximum and minimum diameter is selected to be such that, considering the length and material thickness of strips 10, the bending of strips 10 occurs within the elastic deformation range when strips 10 are bent so that the minimum diameter expands to match the maximum diameter.

The spool end 4 is pushed inside the quill portion 5, expanded as described above, so that the end extends up to the zone of cylindrical surface 20. Thereafter, the pulling force applied to strips 10 is released, said minimum diameter area 21 squeezing vigorously around the spool end 4. Since the spool end 4 still extends a substantial distance beyond this squeezing point, the compressive force is spread over a large area and sufficiently far from the spool end, so this compression does not cause crushing of the spool end. However, this compression is sufficiently even after the heat expansion that has taken place at normal operating temperature in order to maintain the axial alignment of said end cap even though the end of a rather long stub axle 6 is subjected to a radial load which tends to skew the end cap at spool end 4.

When the mounting is effected at a normal temperature, the cylindrical surfaces 22, 21 and 20 of sliding fit assure the precise centering of an end cap. This centering is not lost when the expansion force pulling strips 10 outwards is released, since no elastic displacements can occur.

The invention includes also an auxiliary device 3 for effecting the outward bending of strips 10 quickly and readily. The auxiliary device 3 comprises an annular jacket or mantle 7 that can be fitted around the end cap quill portion 5. The annular jacket 7 is provided with circumferential unthreaded holes 17 whose spacing matches that of threaded holes 11 in strips 10. The screws 18 extending through said holes 17 can be engaged in threaded holes 11. Inside said annular jacket 7 at holes 17 there is an internal annular rib 25 and the diameter of its cylindrical surface is dimensioned with a precise fit to exceed by a certain clearance the diamete of said external annular rib 19 on quill 5. One half of this diameter clearance equals exactly the distance that strips 10 must be bent to make the minimum diameter point 21 equal to the maximum diameter points 20 and 22. This diameter clearance is within the range of 0,2–1,5 mm, preferably within 0,4 –0,8 mm. In a typical spool size, whose end portion 4 has an 85 mm diameter, a suitable diameter clearance will be 0,6 mm, one half of it thus corresponding to the distance that the central areas of strips 10 must be bent. This deflection is readily achieved by turning each screw 18 a bit less than a complete turn manually by means of a wrench. When all strips 10 are bent by means of screws 18, the spool end 4 can be driven inside the end cap and screws 18 are unscrewed from threaded holes 11 and auxiliary device 3 is removed from around the end cap. The compressive force produced by all strips 10 together is typically in the order of 2 –3 tons.

In the present case, one end of the annular jacket 7 of said auxiliary device 3 is sealed with an annular end flange 24 from which extends a quill member 8 whose aperture 16 fits around the end cap stub axle 6 with sliding fit.

A spool provided with an end cap of the invention can be pulled through a hot furnace without damaging the end cap or its mounting. By means of the auxiliary device, said end cap is readily and quickly removable from the spool end mountable on the end of a new spool. Thus, the end caps of broken or otherwise wrecked spools can also be reused.

A wall strip 10 in quill 5 provides a beam rigidly fixed at both ends. When studying the bending line (deflection) of such a beam, it will be noted (FIG. 2b) that to a large degree it conforms to the shape of the internal surface of strip 10, in other words, no substantial deflection occurs in the area of maximum diameters at the ends and transition over to the area of maximum deflection in the center of the beam occurs in a manner that the deflection increases substantially to the same extent as the internal diameter decreases as a result of conicity. At the maximum point of deflection, the curve top is relatively flat conforming to the axial extent of the minimum diameter point.

I claim:

1. An end cap for a ceramic spool, comprising a cylindrical metal tubular quill which defines a space open at one end and generally closed at the other end thereof, the spool end being insertable and resiliently fastenable into said space, the wall of said tubular quill is divided by means of spaced slits into strips extending along a portion of the length of said tubular quill, said open end of said tubular quill comprises a continuous cylindrical ring portion to which first ends of said strips are rigidly connected, and said closed end of said tubular quill is rigidly connected to the other ends of said strips, and each of said strips is provided with gripping means for external engagement to radially expand said quill to either assemble said cap with or remove said cap from said spool.

2. An end cap as set forth in claim 1, characterized in that in the area of said strips there is a zone whereat the internal diameter of said tubular quill is at its smallest.

3. An end cap as set forth in claim 2, characterized in that the internal diameter of said tubular quill decreases from the ends towards the center, said zone of minimum diameter being aligned in an axial direction with said gripping means.

4. An end cap as set forth in claim 2, characterized in that said zone of minimum diameter has a certain, short axial extent or a plurality of such zones are spaced from each other by a short axial distance.

5. An end cap as set forth in claim 1, characterized in that in the end zones of said tubular quill, the internal quill surface is provided with axially short cylindrical surfaces, whereat the internal quill diameter is at its maximum.

6. An end cap as set forth in claim 3, characterized in that the external surface of said tubular quill is provided with an annular rib including threaded holes which serve as gripping means.

7. An end cap as set forth in claim 1, characterized in that the other ends of said strips are rigidly connected either directly or by way of an annular portion in said tubular quill to a flange closing the other end of said tubular quill, with a stub axle extending from said flange.

* * * * *